United States Patent [19]

Rossi

[11] 3,760,712
[45] Sept. 25, 1973

[54] MECHANICAL UNIT FOR BREWING INFUSIONS, MORE PARTICULARLY ESPRESSO-COFFEE

[76] Inventor: Luigi Rossi, Via Alessandria 2, Pontecurone, Italy

[22] Filed: Dec. 1, 1971

[21] Appl. No.: 203,753

[30] Foreign Application Priority Data

Dec. 1, 1970 Italy .............................. 32498 A/70

[52] U.S. Cl. .............................................. 99/289
[51] Int. Cl. ............................................ A47j 31/30
[58] Field of Search ..................... 99/289, 297, 279, 99/287

[56] References Cited
UNITED STATES PATENTS

| 3,064,553 | 11/1962 | Simjian | 99/289 |
| 3,266,410 | 8/1966 | Novi | 99/289 |
| 3,356,011 | 12/1967 | Parraga | 99/289 |

Primary Examiner—Robert W. Jenkins
Attorney—Holman & Stern

[57] ABSTRACT

An automatic machine is disclosed, for brewing infusions, more particularly espresso coffee, in which a first cylinder has a first piston reciprocable therein, and into which a second piston can enter, as driven by a stem, for providing a brewing chamber. The distinguishing feature of the machine according to the invention is that a second cylinder is provided, having the same diameter as the first, the second cylinder being movable between a loading position (charge of coffee powder) in which the second cylinder is coaxial with the first, and a second position, in which the second cylinder is far from the first. The second cylinder has a sector, hinged to another sector and the former can be opened against the bias of a spring. The advantage achieved by the invention is to reduce the size and the mechanical intricacy of the assembly to a minimum.

9 Claims, 9 Drawing Figures

MECHANICAL UNIT FOR BREWING INFUSIONS, MORE PARTICULARLY ESPRESSO-COFFEE

BACKGROUND OF THE INVENTION

This invention relates to a mechanical unit which is adapted to the brewing of infusions, especially espresso coffee, said unit being susceptible of automatic control.

The espresso-coffee machines in use nowadays are preferably equipped with servoed mechanisms which perform the principal operations which are required for infusion brewing.

Mechanical units are known, preferably controlled by hydraulic systems, in which devices for metering the coffee powder and the like and for properly compressing the powder are incorporated, in combination with means for brewing the infusion and dumping the coffee dregs.

This invention has as its object to provide one of these mechanical units which has a minimum weight and size and whose sructural intricacy is reduced to a minimum. This to the end of reducing both the initial cost and the upkeep requirements, latter being especially cumbersome in automatic coffee-brewing machines which are operated by a token or a coin, and which obviously do not require personnel attendance.

An additional object of the present invention is to reduce the idle time of the unit possibly occurring when the different devices the unit is made of are positioned with nonactive strokes so as to be preset, from time to time, for a new cycle of operations which are conducive to infusion brewing.

BRIEF SUMMARY OF THE INVENTION

The mechanical unit for the preparation of infusions, more particularly espresso coffee, according to the present invention, comprises a first cylinder in whose interior a first piston is moveable, and in which a second piston can enter, as driven by a stem, thus providing an infusion chamber sandwiched between said pistons, and is characterized in that it comprises a second cylinder having the same diameter as the first and is open at both ends, movable between a first loading position, for brewing the coffee powder infusion, and coaxial with the first cylinder, and a second position removed therefrom; in said second position coffee powder feeding means load a dosage unit to the second cylinder which, when displaced between the two positions is moved between two component parts in a sealtight manner with respect to its bases; said second cylinder comprises a sector which is hinged to the other sector and can be opened against the bias of a spring for allowing the second cylinder to be removed from the first cylinder, overtaking the stem when the second piston is housed in the first cylinder so as to provide the infusion chamber.

The mechanical unit according to the present invention can be arranged so that the cylinders and the pistons have horizontal axes and the coffee powder feeding means feed a unit dosage of coffee powder to the second cylinder through a radial window formed through the cylinder sidewall.

The mechanical unit, in addition, can be so arranged that both the cylinders and the pistons have a vertical axis and, if so, it is advisable that the coffee powder dispensing means feed the second cylinder through an opening formed through the upper one of the two sealing walls aforementioned.

According to a preferred embodiment of the mechanical unit according to the present invention, the two pistons, in their position where they are spaced apart from one another by the maximum distance, are so arranged that their heads are aligned with either of said two walls, respectively, between which the second cylinder is moveable.

Thus, the heads of the pistons, which have provided the brewing chamber, come into registry with the bases of the second cylinder as the latter is moved, so that a thorough discharge is ensured of the coffee dregs which may stick to either piston head. The importance of a thorough removal of coffee dregs in connection with the aroma of coffee as prepared in immediate sequence is universally known.

BRIEF DESCRIPTION OF THE DRAWINGS

In order that further objects and features of the mechanical units according to the present invention may be better understood, a particular embodiment thereof will now be described by way of example only and illustrated in the accompanying drawings, wherein.

DETAILED DESCRIPTION OF PREFERRED EMBODIMENTS

Figure 1:
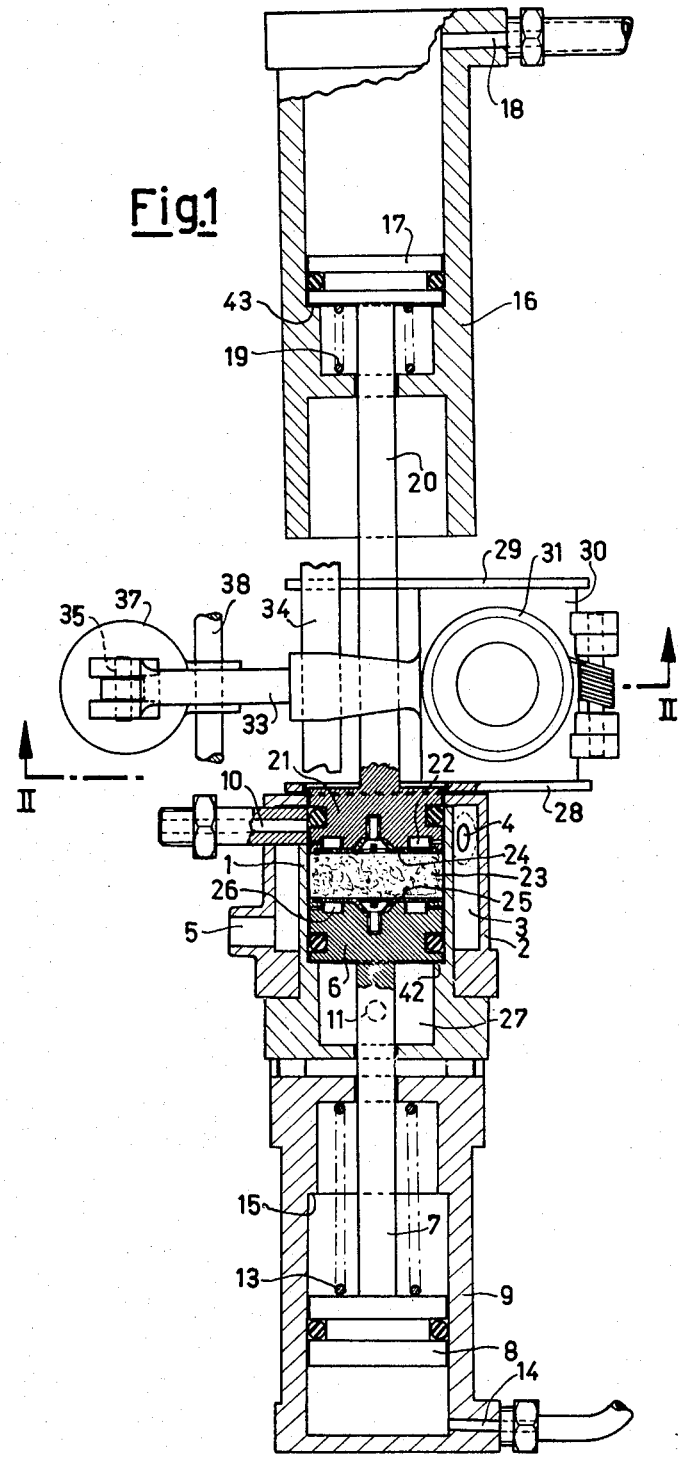
FIG. 1 is a plan view, partly in cross-section, of the mechanical unit.

With reference to FIG. 1, the hydraulic and mechanical unit for infusion brewing comprises a cylinder 1 as surrounded by a sleeve 2 which forms a jacket 3 in which hot water is caused to circulate, as entering through the feeding duct 4 and emerging through the discharge duct 5. The cylinder 1 houses a piston 6 which slides under the control of a stem 7 integral with another piston 8, the latter being slidable in a cylinder 9 coaxially arranged with respect to the cylinder 1.

In the cylinder 2, two channels open, 10 and 11, for the intake of hot water intended for coffee brewing, and for discharging the brewed infusion to the outside, respectively.

The piston 6 is biassed to the position shown in FIG. 1 by a compression spring 13 which is active upon the piston 8 and is stopped when abutting an annular abutment ridge 42. The presence of a spring or any other equivalent means is not essential, as will be specified hereinafter. The rightward motion, as viewed in FIG. 1, of the piston 6 is controlled by the introduction of a fluid under pressure into the cylinder 9 through a duct 14, so as to drive the piston 8 until it abuts ridge 15, being stopped thereby.

Within a cylinder 16, which is coaxial with the cylinder 1, a piston 17 is slidable, which is driven towards the left by the introduction of a fluid under pressure as fed through the duct 18. The return stroke is carried by the bias of the spring 19, which is a compression spring. The piston 17 is connected by the agency of a stem 20 to a piston 21. The piston 21 carries draining channels 22 for the water coming from duct 10, the water contacting the coffee powder 23 through the filter 24. Likewise, the brewed infusion goes through the filter 25, as mounted on the piston 6, to become collected in the channels 26 and reaches the chamber 27 from which it emerges through the duct 11, coming to a pouring spout (not shown in the drawings). During this stage, hot water is caused to circulate through the cavity 3 by means of the ducts 4 and 5 so as to bring the brewing chamber to the optimum temperature.

Figure 2:
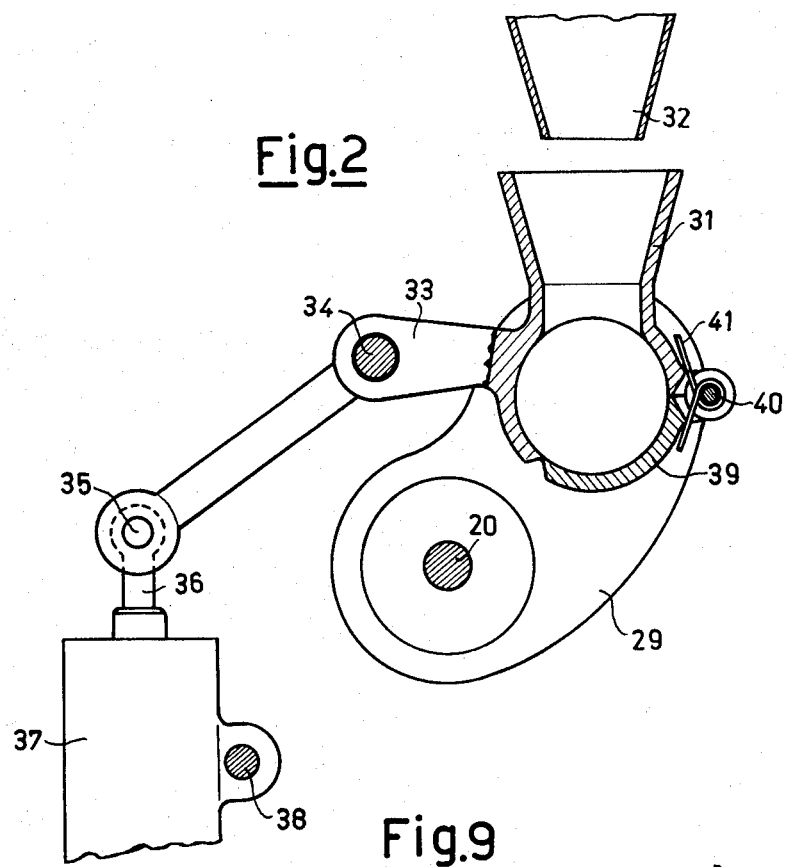
FIG. 2 is a cross-sectional view, taken along the line II—II of FIG. 1.

Integral with the fixed portion of the unit, there are two planar walls 28 and 29, between which is located a metering dispenser 30: the latter has a radial opening 31 which, when the metering dispenser is in its idle position, as shown in FIGS. 1 and 2, is in registry with a coffee powder feeding hopper 32, shown only partially in the drawing.

The metering dispenser 30 is borne by an arm 33 pivoted at 34 to the fixed portion of the unit and, at 35, to the stem 36 of a conventional hydraulic control 37, the latter being linked, in turn, at 38 to the fixed portion of the unit.

A sector 39 of the sidewall of the metering dispenser 30 is pivoted at 40 to the body of same sector and can be flipped out against the bias of a spring 41.

As seen in FIG. 2, the wall 29 is open in correspondence with the passage for the piston 21, of which a portion of the stem 20 is visible in cross-section. The wall 28 is shaped in very much the same way.

With reference to the subsequent partial views of the unit, in their different positions as they take during operation and shown in FIGS. 1 to 8, the operability of the component parts of the unit will now be described in an abridged manner.

For the sake of clearness of the disclosure, the position as shown in FIGS. 1 and 2 is assumed to be the first of a complete cycle which is repeated indefinitely.

In such a position, the pistons 6 and 21 are placed confrontingly so as to form a brewing chamber which contains the coffee powder 23. Such a position is maintained by supplying the cylinder 16, via the duct 18, with water at an appropriate pressure.

Under these conditions, the infusion can be brewed and collected by the duct 11 by feeding the duct 10 with water at an appropriate temperature.

The metering dispenser 30 is in such a position as to be able to be loaded with a coffee unit dosage via the hopper 32.

Once the infusion has been brewed, the feed of water or another fluid under pressure to the duct 18 is discontinued and said duct is now connected with conventional means to a discharge (not shown). The piston 17 and thus also the piston 21 can slide towards the right under the bias of the spring 19. In addition, water under pressure is fed to the cylinder 9 through the duct 14 and the piston 8 is shifted towards the right and entrains the piston 6 in its stroke. The coffee dregs are thus ejected from the cylinder 1. It is known that, upon brewing of the infusion, the dregs tend to agglomerate and to form a comparatively tightly packed cake, which tends to stick to the filters 24 and 25 somewhat, so that it can emerge as stuck to either filter or partly to one filter and partly to the other one.

It is important to notice that, at the end of their rightward stroke, the pistons 6 and 21 are in alignment with the walls 28 and 29, respectively.

Water under pressure is then conventionally fed to the hydraulic jack 37 and the latter, by being extended, controls the rotation of the arm 33 about 34 and thus the displacement thereof from the dispenser 30 connected threrto. This movement, in the example shown, involves the rotation of the jack 37 about 38 for a correct mechanical operation of the whole assembly.

Figure 3:
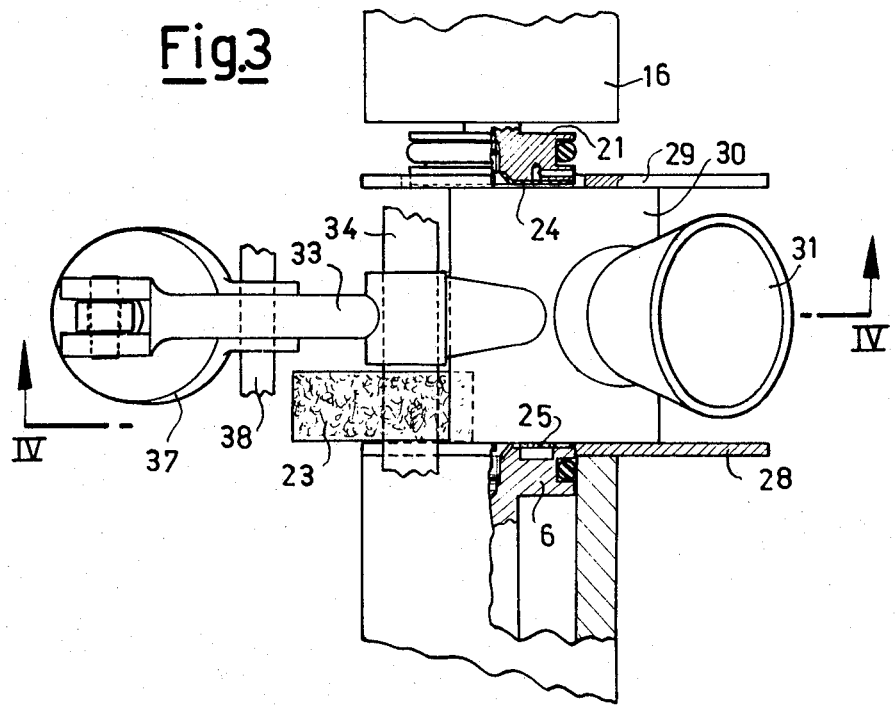
FIGS. 3, 5 and 7 are similar plan views, partly in cross-section, of the central portion of the unit, correspondingly to several positions of the movable members.
Figure 4:
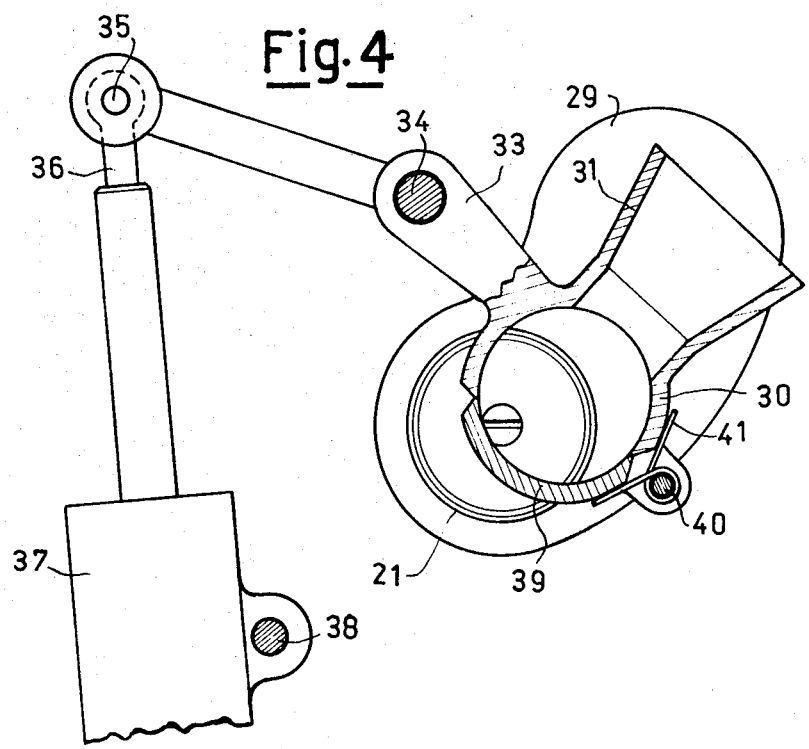
FIG. 4 is a cross-sectional view taken along the line IV—IV of FIG. 3.

FIGS. 3 and 4 show the pistons 6 and 21 in the end of stroke positions towards the right and the dispenser 30 which goes to be placed in a position aligned therewith. As outlined above, in this stage the dispenser 30 contains an appropriate dosage of fresh coffee powder, not shown in the drawing for the sake of clearness.

It has been clearly shown that, during its movement, the dispenser 30 sweeps the filters 24 and 25 and removes the coffee dregs which had possibly become stuck thereto.

In the example shown, it has been assumed that the coffee dregs 23 adhere to the filter 25 in the form of a cake. In FIG. 3, it shown that the cake is removed by the body itself of the dispenser 30.

Figure 5:
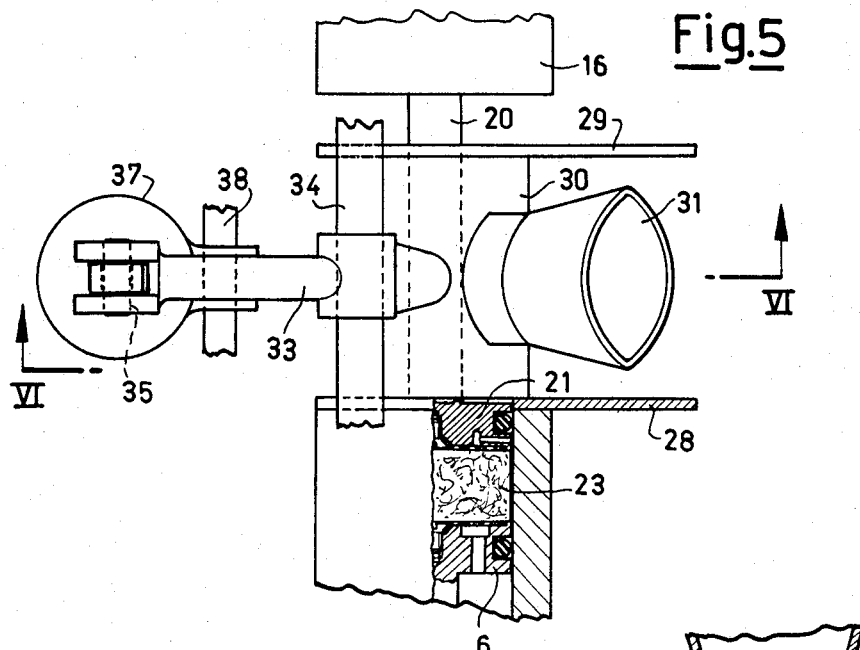
Figure 6:
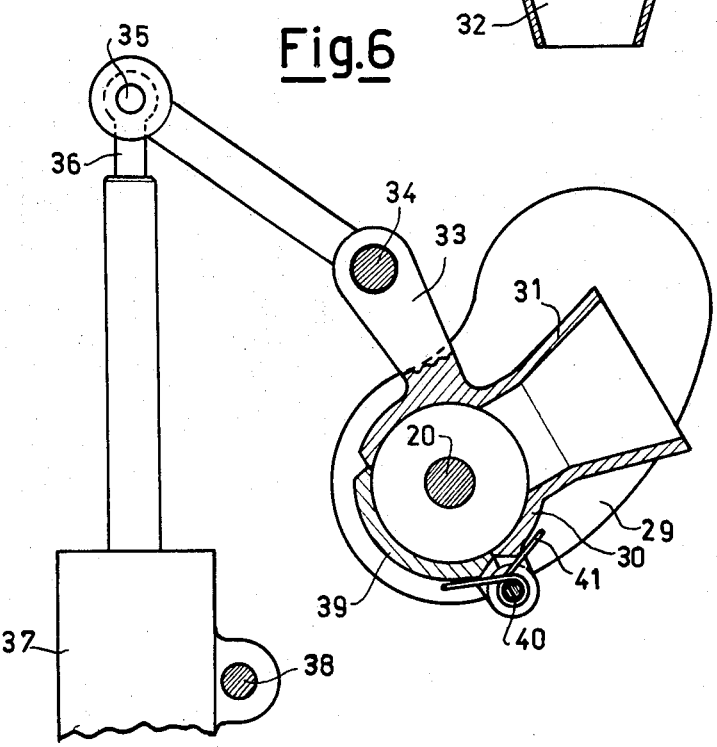
FIG. 6 is a cross-sectional view, taken along the line VI—VI of FIG. 5.

As soon as the dispenser 30 has been positioned coaxially with respect to the cylinder 1, water feed through the duct 14 is discontinued, the duct being conventionally connected to a sink (not shown) and the piston 6 is driven towards the left by the spring 13. Conversely, water under pressure is fed to the duct 18 so that the piston 17 is thrust towards the left and drives the piston 21 until abutting the ridge 43: the piston 21 enters the dispenser 30 and, by thrusting forward the fresh coffee powder becomes housed in the chamber 1 and compresses the powder against the piston 6, as shown in FIGS. 5 and 6.

It can now be noticed that the resilient member 13, or any other equivalent means as provided for bringing the piston 6 back may become redundant, if provisions are made so that the piston 6 may be allowed to effect its return stroke as driven by the piston 21 in the leftward stroke of the latter, the fresh coffee powder being sandwiched therebetween.

It could be both desirable and advantageous that, in some instances, the brewing chamber as sandwiched between the pistons 6 and 21 has a size which can be varied as a function of the amount of coffee which is fed in. This prevents that the powder may be excessively compacted or, on the contrary, that it may be too loosely packed: in both cases, the quality of the infusion is poor and there are difficulties when the dregs are to be discharged. A variable-volume chamber is desirable, both to suit the different volumes an equal quantity of coffee by weight can have according to the quality of the coffee, and to accommodate the volume variations the coffee powder may undergo during progress of the brewing step: as a matter of fact, the coffee powder tends to swell as it is moistened, whereas it shrinks as water flows through the powder mass.

Figure 9:
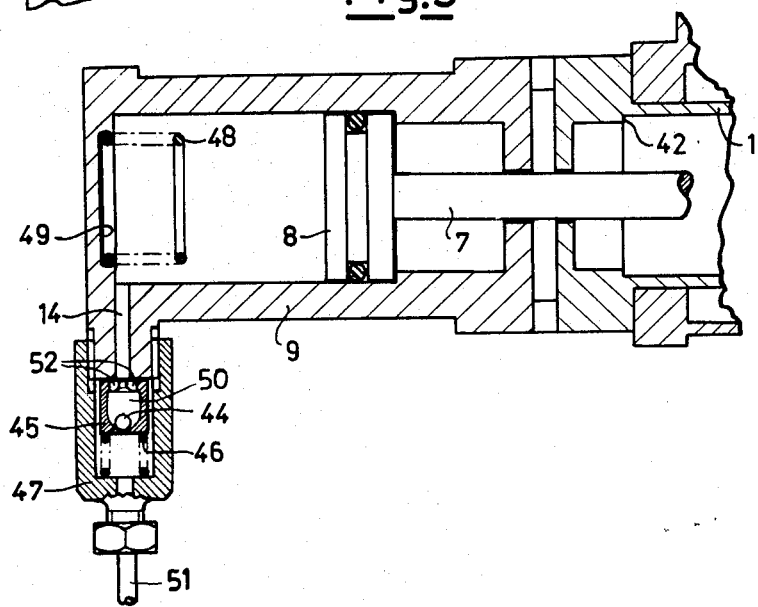
FIG. 9 is a plan view, in cross-section, of an alternative embodiment of the unit shown in the preceding Figures.

A variable-volume brewing chamber can be obtained as shown in FIG. 9. The inlet and outlet duct 14 of the cylinder 9 receives the liquid from the piping 51 through a non-return valve consisting of a ball 44 which is movable in the interior of a specially provided chamber 50 of a plunger 45 which, in turn, is movable with a side clearance against the bias of a spring 46 in the body 47 as screwably affixed to the cylinder 9. With such an arrangement, the fluid under pressure is fed to the duct 14 after having passed through the cavity 50 of the plunger 45 and grooves 52 in said plunger, which maintain the chamber 50 in communication with the duct 14 irrespective of the position of the ball 44. The same fluid is ejected from the duct 14 but is intercepted by the ball 44 which is positioned as shown; however, for a certain magnitude of the pressure, the plunger 45 is urged in a direction against the spring bias and the fluid passes between the plunger and the body 47 and can thus be discharged; by properly calibrating the spring 46 the magnitude of the pressure at which the fluid can be discharged can obviously be adjusted. If the piston 6 and thus the piston 8 integral therewith is thrust by the piston 21, the coffee powder being sandwiched therebetween, the result is that the powder is compressed at a pressure magnitude which is substantially equal to that of the pressure provided for discharging the fluid from the cylinder 9. To this purpose, the ridges 42 will be lowered so as to stop the piston 6 in exceptional cases only for coffee powder charges which are not regular.

A spring 40 can be provided for, in addition to, or in replacement of, the means which maintain the discharge pressure of the cylinder 9. The spring 48 is housed with either end in a chamber 49 and rests against the piston 8 when the piston 6 is retracted to form the brewing chamber.

Any variation, even a reduction, of the volume of the powder to be brewed is thus resiliently balanced, so that the pressure on the same powder remains substantially equal the entire brewing period through-out.

The thus modified unit is then adapted to use larger or smaller powder unit dosages so as to produce stronger or weaker infusions.

A brewing chamber whose volume can be resiliently varied could also be obtained by dispensing with the ledge 43 for the piston 17 so that the piston 21 can be freely moved as the powder volume is varied during the brewing step. Of course, the feeding pressure for the cylinder 16 must be, in such a case, in the order of the not too high pressure at which it is desirable to subject the coffee powder: this fact, however, could lead to an irregular movement of the pistons 17 and 21 whenever they, for any reasons, are confronted with an unusual resistance during their motions.

When the unit is positioned as shown in FIGS. 5 and 6, it is possible to start the brewing operation, as explained above, while simultaneously bringing the dispenser 30 back to its loading position as shown in FIG. 1. The control member 37 is thus driven so as to be withdrawn and the dispenser 30 is rotated about 34.

Figure 7:
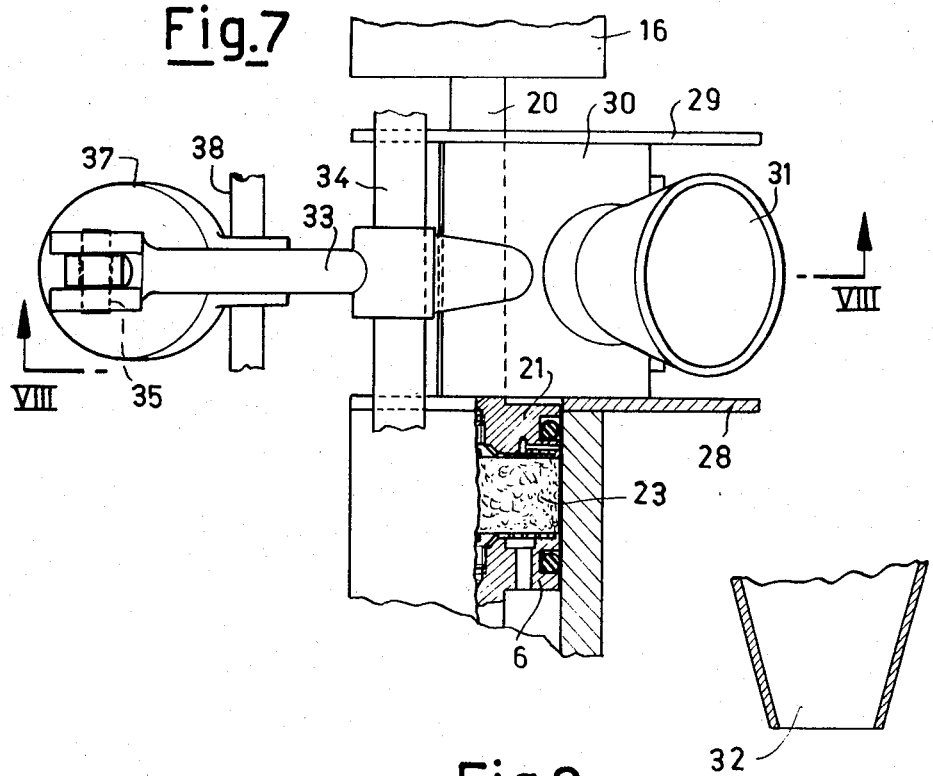
Figure 8:
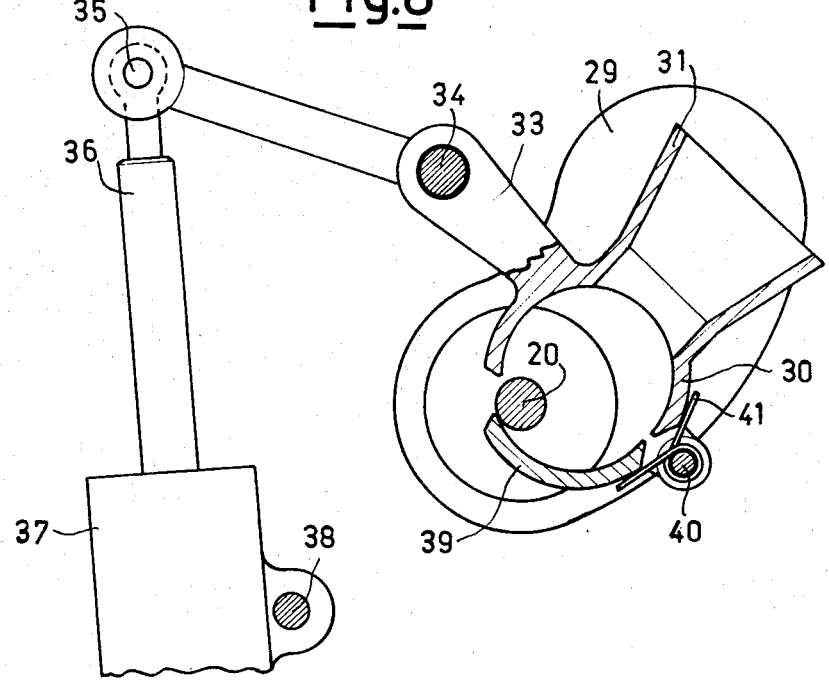
FIG. 8 is a cross-sectional view, taken along the line VIII—VIII of FIG. 7.

During its return stroke, the stem 20 impinges on the movable sector 39, which, by being rotated, gives a free way to the stem, as shown in FIGS. 7 and 8. Once the stem has gone past, the sector 39 is resiliently brought back to its closed position, and the whole unit takes the same position as shown in FIGS. 1 and 2.

It is fitting to enumerate the advantages which can be obtained by so moving the dispenser 30: in the first place, due to the presence of the movable wall 39, it is not necessary to wait until the piston 21 has been withdrawn, an unnecessary idle time being thus removed. Furthermore, should the dispenser 30 be withdrawn when the piston 21 has gone far away, the coffee dregs left upon brewing would remain in the interior of the dispenser and this fact would impair the taste of an infusion prepared in immediate sequence. If the dregs are then in an excessive quantity, they could cause irregularities in the subsequent loading of the dispenser 30 and in the compression of the powder between the pistons 6 and 21 as well.

The cyclical sequence of the operations as performed by the unit has been shown starting from the position illustrated in FIG. 1, to afford a clearer understanding of the operability of the individual component parts of the unit. However, the at rest position of the unit could be any proper position, as selected at leisure: for example immediately after the position shown in FIGS. 3 and 4, that is, with the pistons 6 and 21 in their set apart position and the dispenser 30, containing the coffee powder, arranged coaxially therewith.

It is extremely important to notice that the movement of the dispenser 30 permits that the powder hopper 32 may be arranged apart from the brewing chamber as formed by the cylinder 1, so that the hopper is not impinged by the steam stream which can be originated in the brewing chamber as it is opened after the infusion step has been completed. For the sake of a better safety, the mouth 32 is masked by the dispenser 30 as the chamber is opened. By so doing, moisturization of the hopper 32 is avoided, which could be conducive to clogging due to the powder being lumped up.

The operation of the unit according to this invention has been described without illustrating the particular systems for water feeding, both for the preparation of the infusion and for the hydraulic control of the movable parts, inasmuch as they are well known and used in the practice for units having a similar purpose.

More particularly two devices which should operate simultaneously are simultaneously connected to a single feed source: as an alternative, provisions are made so that a movable member, at the end of its stroke, may send, through conventional means, an actuation command for a movable member intended to perform the subsequent step in the operative sequence described hereinabove. By so doing, an initial manual command can be followed by the entire sequence of the steps intended for brewing the beverage, an automatization of the unit being thus made possible, that which renders it particularly suitable both to machines which dispense the beverage by the introduction of a token and to machines which operate at the counter according to an automatic cycle.

Similarly, the duct 10 for feeding water intended for brewing can be fed simultaneously with the device 37 which controls the dispenser 30; so that, during the brewing of the infusion the dispenser is positioned in the loading position as described above in the operational sequence.

It is fitting to note, at last, that the device described herein as a horizontally operating machine, can be embodied for the vertical operation, the modifications being obvious. More particularly, the mouth 31 of the dispenser 30 can be designed otherwise, so as to exhibit, in the appropriate direction, the opening towards the outside. The mouth can also be applied directly to the wall 29 in correspondence with the position of the dispenser 30 far away of the cylinder 1, as shown in FIGS. 1 and 2.

What is claimed is:

1. A mechanical unit for the brewing of infusions, more particularly espresso coffee, comprising a first cylinder in whose interior there is a first moveable piston and into which can penetrate, driven by a stem, a second piston thereby forming a brewing chamber between the two pistons, the improvement comprising two component parts; a second cylinder having a diameter equal to the first and open at both ends, moveable between a first position, coaxial with the first cylinder, for loading in the infusion brewing dosage of coffee powder, and a second position, removed from the first cylinder, in which dispensing means for coffee powder feed a unit dosage to the second cylinder which, during the displacement between said two positions, is moveable between the two component parts in sealtight manner with respect to its bases; said second cylinder including a hinged sector which can be opened against a spring bias to allow said second cylinder to be removed from said first cylinder by passing over said stem when the second piston is housed in the first cylinder so as to form a brewing chamber.

2. The mechanical unit according to claim 1, characterized in that said first and second cylinders have vertical axes and the dispensing means feeds a unit dosage to said second cylinder through an opening in the upper wall of said two component parts.

3. The mechanical unit according to claim 1, characterized in that said first and second cylinders have horizontal axes and the dispensing means feeds a unit dosage to said second cylinder through an opening formed radially through the second cylinder wall.

4. The mechanical unit according to claim 1, characterized in that said second cylinder is moveable for rotation about an axis parallel to the generating lines of the cylinder.

5. The mechanical unit according to claim 1, characterized in that the moveable sector of the second cylinder consists of a portion of a surface located between two generating lines and is moved about an axis which is parallel to said generating lines.

6. The mechanical unit according to claim 1, characterized in that said first piston is moved within said first cylinder from a first position therein, where it forms the base of the brewing chamber, to a second position where its head is aligned with either of said component parts, said second piston being moveable between a position within said first cylinder and a second position in which it has its head aligned with the other of said component parts.

7. The mechanical unit according to claim 1, characterized in that said first piston effects the stroke necessary to be positioned within said first cylinder under the thrust of said second piston, a unit dosage of coffee powder being inserted therebetween.

8. The mechanical unit according to claim 7, characterized in that said first piston is braked during its stroke by a substantially constant resistance force.

9. The mechanical unit according to claim 8, characterized in that said first piston is braked in its stroke by a resistance force which is resilient and proportional to the stroke.

* * * * *